(12) United States Patent
Karusawa

(10) Patent No.: US 7,231,179 B2
(45) Date of Patent: Jun. 12, 2007

(54) MOBILE PHONE APPARATUS, LOCAL WIRELESS COMMUNICATION METHOD USED THEREFOR AND PROGRAM THEREOF

(75) Inventor: Kiyoko Karusawa, Tokyo (JP)

(73) Assignee: NEC Corporation, Tokyo (JP)

( * ) Notice: Subject to any disclaimer, the term of this patent is extended or adjusted under 35 U.S.C. 154(b) by 660 days.

(21) Appl. No.: 10/661,305

(22) Filed: Sep. 12, 2003

(65) Prior Publication Data
US 2004/0053573 A1 Mar. 18, 2004

(30) Foreign Application Priority Data
Sep. 18, 2002 (JP) .............................. 2002-270853

(51) Int. Cl.
*H04B 7/00* (2006.01)
(52) U.S. Cl. ................... 455/41.2; 455/435.2; 455/461; 455/445; 455/426.1; 455/512; 455/435.3; 370/328; 370/338; 370/349
(58) Field of Classification Search ............... 455/41.2, 455/512, 435.1, 435.2, 435.3, 426.1, 445, 455/461, 426.2
See application file for complete search history.

(56) References Cited

U.S. PATENT DOCUMENTS

| | | | | |
|---|---|---|---|---|
| 5,790,952 A | * | 8/1998 | Seazholtz et al. | 455/432.1 |
| 6,035,193 A | * | 3/2000 | Buhrmann et al. | 455/426.1 |
| 6,185,413 B1 | * | 2/2001 | Mueller et al. | 455/405 |
| 6,477,373 B1 | * | 11/2002 | Rappaport et al. | 455/436 |
| 6,519,453 B1 | * | 2/2003 | Hamada et al. | 455/432.1 |
| 6,580,704 B1 | * | 6/2003 | Wellig et al. | 370/338 |
| 6,741,870 B1 | * | 5/2004 | Holmstrom et al. | 455/557 |
| 6,744,753 B2 | * | 6/2004 | Heinonen et al. | 370/338 |
| 7,042,866 B2 | * | 5/2006 | Famolari | 370/338 |
| 7,069,018 B1 | * | 6/2006 | Granstam et al. | 455/456.1 |

FOREIGN PATENT DOCUMENTS

| | | |
|---|---|---|
| EP | 1 229 704 A2 | 8/2002 |
| JP | 2000-101506 | 4/2000 |
| JP | 2001-144767 A | 5/2001 |
| JP | 2002-84361 | 3/2002 |
| JP | 2002-125268 | 4/2002 |
| JP | 2002-135367 | 5/2002 |
| JP | 2002-232956 | 8/2002 |
| WO | WO97/34403 | 9/1997 |
| WO | WO99/45685 | 9/1999 |

* cited by examiner

*Primary Examiner*—Marceau Milord
(74) *Attorney, Agent, or Firm*—Scully, Scott, Murphy & Presser, P.C.

(57) ABSTRACT

A mobile phone has a controller which on detection of an incoming call, selects one of plural local wireless communication devices, registered in a memory which ranks high in the priority order, and which then controls a local wireless communication unit to transmit a connection request to the selected local wireless communication device while starting a timer. When the local wireless communication unit receives a connection response from the selected local wireless communication device, the controller performs connection processing to establish the local wireless connection to transmit an incoming call notification signal. On receipt of an incoming call response signal from the local wireless communication device, the controller controls a RF unit to establish a line connection to enable a talk state or a state of data communication. On detection of disconnect of the line connection, the controller disconnects connection of the local wireless communication.

21 Claims, 9 Drawing Sheets

| LOCAL WIRELESS COMMUNICATION DEVICE | RANK IN PRIORITY ORDER |
|---|---|
| DEVICE A | 2 |
| DEVICE B | 1 |
| AWAITING | 3 |

MOBILE PHONE APPARATUS, LOCAL WIRELESS COMMUNICATION METHOD USED THEREFOR AND PROGRAM THEREOF

FIELD OF THE INVENTION

This invention relates to a mobile phone, a local wireless communication method used therefor, and to a computer program thereof. More particularly, it relates to a mobile phone having a local wireless communication function for realizing a near wireless communication system used in wireless LAN (Local Area Network).

BACKGROUND OF THE INVENTION

Up to now, as a short range wireless communication system, standardized systems, such as IEEE802.11b, IEEE802.11a or IEEE802.11g, used for wireless LAN, or Bluetooth (Registered Trademark), have become known.

With a mobile phone, which is equipped with the local wireless communication function for realizing the short range wireless communication system, a user may talk, without holding the mobile phone, by connecting the mobile phone to a handsfree kit or a headset with the local wireless communication function. Meanwhile, the local wireless communication function is that of wireless communication over a short range, and hence is featured by low power dissipation.

On the other hand, the PC (personal computer) having a local wireless communication function or PDA (Personal Digital Assistant) may be connected to a mobile phone having the local wireless communication function in order to have data communication by dial-up connection or facsimile connection.

As a method for use, the customary practice is to connect the mobile phone at all times with a headset, a hands free kit, a PC or a PDA, or to set the local wireless communication function of the mobile phone at all times in an awaiting state, in order to be able to accept the connection from these devices at any time (for example, see Reference Cited 1).

For example, the local wireless communication connection between the mobile phone and the headset or the hands-free kit is established at the outset. On detection of an incoming call (IC), a signal indicating the incoming call is sent out to the headset or to the hands free kit. The headset or the hands free kit notifies the user of the incoming call. The user makes a reply operation by using the headset or the hands free kit to answer the call to have a talk. If connection is to be made from the headset or the hands free kit, on receipt of an incoming call, it is necessary to keep the local wireless communication function of the mobile phone at all times in an awaiting state at all times or to set the local wireless communication function of the mobile phone in the awaiting state by user's manual operation.

[Reference cited 1]

JP Patent Kokai Publication JP-P2001-144767A (pages 11 and 12, FIG. 14)

SUMMARY OF THE DISCLOSURE

However, with the above-described conventional mobile phone, it is necessary to set the connected state at all times or to set the local wireless communication function in the waiting state at all times, even when the user has not a talk or when data communication is not going on, thus leading to wasteful power dissipation and to shortened useful life of the battery of the mobile phone.

Moreover, the conventional mobile phone suffers from the problem that, since it is necessary for a user to keep local wireless communication devices in the connected state at all times from the outset, the user has to perform connection processing to the local wireless communication device of interest in keeping up with changes in the use situation of the mobile phone.

The mobile phone is usually carried about during use, such that it may be used in variable different use states in homes, cars or in offices. It is however extremely cumbersome to perform the connection processing of connecting the mobile phone to the device of interest each time the use situation is changed.

Accordingly, it is an object of the present invention to provide a mobile phone, a local wireless communication method used therefor, and a program therefor, in which it is unnecessary to connect the mobile phone at all times to a local wireless communication device of interest, in such a manner as to suppress wasteful power dissipation and to achieve sufficient battery protection.

It is another object of the present invention to provide a mobile phone, a local wireless communication method used therefor, and a program therefor, in which one of a plural number of registered local wireless communication devices which is optimum for prevailing use environment is automatically selected on the basis of the user's intention to establish the connection.

The above and other objects are attained by a mobile phone apparatus in accordance with one aspect of the present invention, which is equipped with a function of local wireless communication for realizing a short range wireless communication system, and which comprises a memory for pre-registering the information on plural local wireless communication devices, adapted for communication with the mobile phone in accordance with the short range wireless communication system, and means for transmitting a connection request to the local wireless communication devices, registered in the memory, using the function of local wireless communication, on the occasion of an incoming call.

A mobile phone apparatus in accordance with another aspect of the present invention, which includes a function of local wireless communication for realizing the short range wireless communication system, comprises a memory for pre-registering the information on a plurality of local wireless communication devices, adapted for communication in accordance with the short range wireless communication system, means for transmitting a connection request to each of the totality of local wireless communication devices, registered in the memory, on the occasion of an incoming call, and means for determining a device for connection, from among the local wireless communication devices, which returned connection responses to the connection request, in accordance with a preset priority order.

A mobile phone apparatus in accordance with another aspect of the present invention, which includes a function of local wireless communication for realizing the short range wireless communication system, comprises means for setting the function of local wireless communication to an awaiting state on an arrival of a call, and means for performing connection processing for the local wireless communication device, using the function of local wireless communication device, on receipt of a connection request from the local wireless communication device, during a period of the function of local wireless communication being in the waiting state.

A method according to another aspect of the present invention, is one for performing local wireless communication by a mobile phone apparatus including a function of local wireless communication for realizing the short range wireless communication system, which comprises the steps of:

detecting an incoming call to the mobile phone apparatus; and transmitting, on the call oncoming, using the function of local wireless communication, a connection request to one of plural local wireless communication devices registered in a memory, designed to pre-register the information of the local wireless communication devices, with which the mobile phone apparatus communicates in accordance with the short range wireless communication system.

A method according to still another aspect of the present invention is also one for performing local wireless communication method by a mobile phone apparatus including a function of local wireless communication for realizing the short range wireless communication system, which comprises steps of:

detecting an incoming call to an own station; and transmitting a connection request to each of plural local wireless communication devices registered in a memory, designed to pre-register the information of the local wireless communication devices, the mobile phone communicating with the local wireless communication devices in accordance with the short range wireless communication system on the occasion of an incoming call; and determining a local wireless communication device for connection from among plural local wireless communication devices which have made connection responses to the connection requests, in accordance with a pre-set priority order.

A method according to yet another aspect of the present invention is also one for performing local wireless communication method by a mobile phone apparatus including a function of local wireless communication for realizing the short range wireless communication system, which comprises steps of:

detecting an incoming call to the mobile phone apparatus;

setting the function of local wireless communication to a waiting state on the occasion of an incoming call; and processing for connecting the mobile phone to the local wireless communication device, using the function of local wireless communication, on receipt of a connection request from the local wireless communication device, during a period of the function of local wireless communication being in the waiting state.

A computer program according to another aspect of the present invention also is one for enabling a computer constituting a mobile phone apparatus including a function of local wireless communication for realizing a short range wireless communication system to execute a local wireless communication, which comprises code segments to enable the computer to execute the steps of:

detecting an incoming call to an own station, and transmitting, on the occasion of an incoming call, using the function of local wireless communication, a connection request to one of plural local wireless communication devices, registered in a memory, designed to pre-register the information of the local wireless communication devices with which the mobile phone apparatus communicates in accordance with the short range wireless communication system.

A computer program according to another aspect of the present invention also is one for enabling a computer constituting a mobile phone apparatus including a function of local wireless communication for realizing a short range wireless communication system to execute a local wireless communication, which comprises code segments to enable the computer to execute the steps of:

detecting an incoming call to an own station;

transmitting a connection request to each of plural local wireless communication devices registered in a memory, designed to pre-register the information of the local wireless communication devices with which the mobile phone apparatus communicates in accordance with the short range wireless communication system on the occasion of an incoming call; and determining a local wireless communication device for connection from among the plural local wireless communication devices which have made connection responses to the connection requests, in accordance with a pre-set priority order.

A computer program according to another aspect of the present invention also is one for enabling a computer constituting a mobile phone apparatus including a function of local wireless communication for realizing a short range wireless communication system to execute a local wireless communication, which comprises code segments to enable the computer to execute the steps of:

detecting an incoming call to the mobile phone;

setting the function of local wireless communication to an awaiting state on an arrival of the call; and connecting the mobile phone apparatus to the local wireless communication device, using the function of local wireless communication, on receipt of a connection request from the local wireless communication device, in the awaiting state of the function of local wireless communication.

That is, the present invention provides a mobile phone having the function of local wireless communication for realizing short range wireless communication systems, featured by short range or low power dissipation [standardized systems, such as IEEE802.11b, IEEE802.11a or IEEE802.11g, used for wireless LAN (Local Area Network), or Bluetooth (Registered Trademark)], in which, when there is an incoming call, such as speech communication or data communication, the connection of local wireless communication is established, or the function of local wireless communication is set to an awaiting state, such as to eliminate the necessity for perpetual connection or perpetual awaiting state, in order to suppress wasteful power dissipation and in order to assure sufficient battery protection.

The mobile phone of the present invention has the function of automatically selecting the local wireless communication device for selection, in dependence on the prevailing use situation, and automatically establishing the connection to the selected local wireless communication device. It should be noted that the local wireless communication device is such a device communicating with the mobile phone of the present invention by a short range wireless communication system.

Specifically, the mobile phone of the present invention memorizes the information of the pre-registered devices in a memory. On receipt of an incoming call, a controller determines the device for connection, from among the devices registered in the memory, based on the priority order pre-set by the user, and controls a local wireless communication unit to send out a connection request to the so determined local wireless communication device.

The controller starts a timer at the same time as the connection response transmits a connection request. Should there be a connection response from the local wireless communication device before the timer times out, the controller manages control to establish the connection to the local wireless communication device. The controller also controls the RF unit to connect to a line. When the line is disconnected, the controller controls the local wireless communication unit to disconnects the connection of local wireless communication.

Thus, with the mobile phone of the present invention, the controller controls the memory, timer, RF unit and the local wireless communication unit, on the occasion of an incoming call, to render it possible to automatically select and establish connection to the local wireless communication device as the destination of connection. When the line is disconnected, the connection for local wireless communication can be disconnected automatically.

With the mobile phone of the present invention, in which an incoming call is detected and connection for local wireless communication is established automatically, while the disconnection of the line connection is also detected and connection for local wireless communication is disconnected automatically, the local wireless connection may be established automatically, only on the occasion of talk or data communication, and hence there is no necessity for perpetual connection so that wasteful power dissipation can be suppressed and sufficient battery protection can be realized.

Moreover, with the mobile phone of the present invention, in which a connection request is transmitted to the registered local wireless communication devices, in the descending order in the priority rank as pre-set by the user, and the processing for establishing the connection is carried out for the local wireless communication device from which the connection response has been returned. Thus, the mobile phone may be connected to the local wireless communication device that ranks highest in the priority order, among the local wireless communication devices that may be connected to the mobile phone under the prevailing condition, and hence it becomes possible to automatically select a local wireless communication device most appropriate under the prevailing condition may automatically be selected from among the plural number of the registered local wireless communication devices, based on the user's intention.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 shows an illustrative structure of a memory according to a fourth embodiment of the present invention.

PREFERRED EMBODIMENTS OF THE INVENTION

Figure 1:
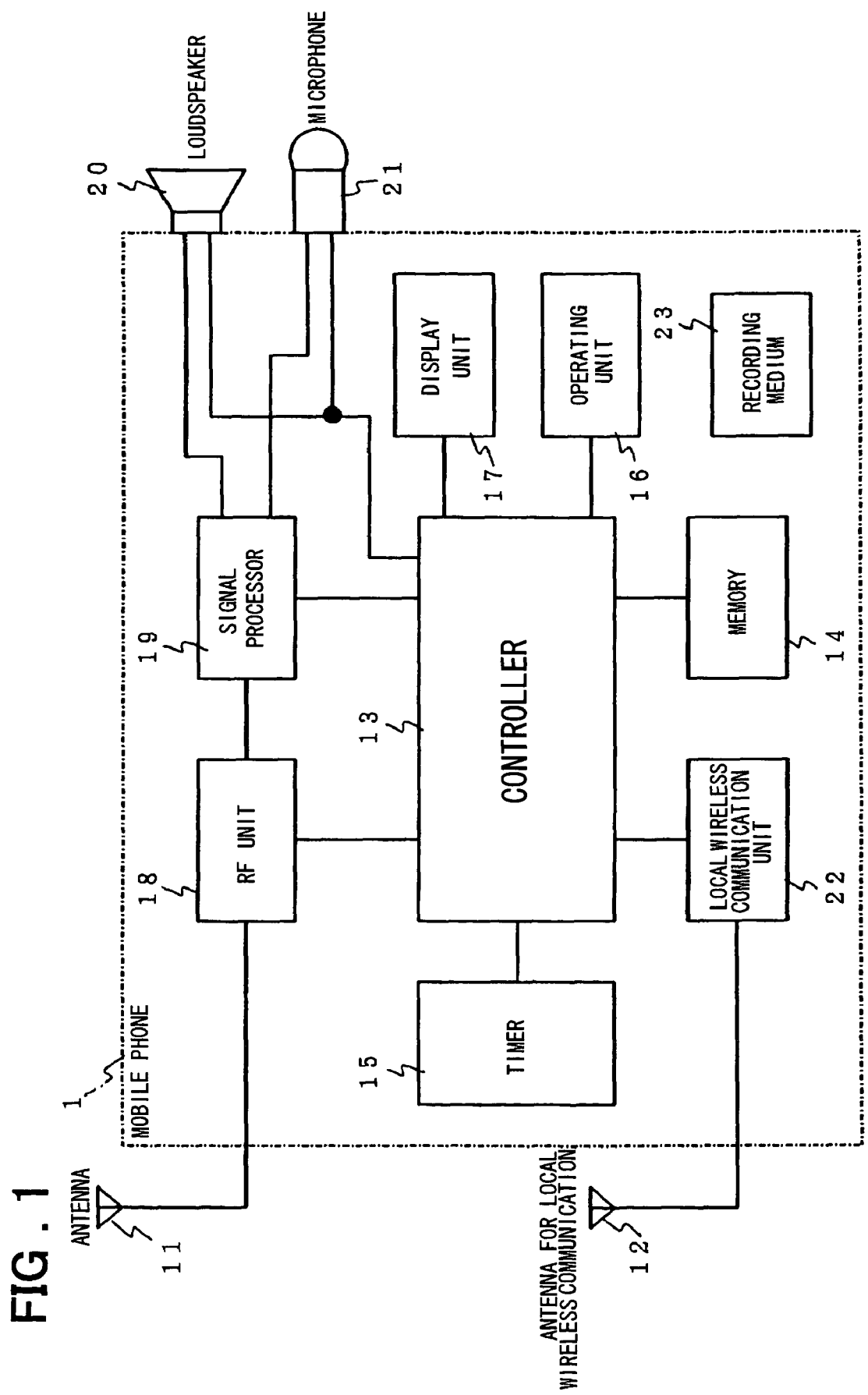
FIG. 1 is a block diagram showing the structure of a mobile phone according to a first embodiment of the present invention.

Referring to the drawings, certain preferred embodiments of the present invention are explained in detail. FIG. 1 is a block diagram illustrating the configuration of a mobile phone according to a first embodiment of the present invention. Referring to FIG. 1, the mobile phone 1 comprises an antenna 11, an antenna for local wireless communication 12, a controller 13, a memory 14, a timer 15, an operating unit 16, a display unit 17, an RF unit 18, a signal processor 19, a loudspeaker 20, a microphone 21, a local wireless communication unit 22 and a recording medium 23.

The antenna 11 is responsible for transmission/reception of electric waves, while the antenna for local wireless communication 12 transmission/reception of electric waves of local wireless communication. The controller 13 is connected to the memory 14, timer 15, operating unit 16, display unit 17, RF unit 18, signal processor 19, loudspeaker 20, microphone 21 and to the local wireless communication unit 22 to control these respective components.

The memory 14 stores e.g. the information of the local wireless communication device, not shown, as well as the order of priority thereof.

When started by the controller 13, the timer 15 starts counting the lapse of time and, when the specified time period has lapsed, the timer 15 notifies the controller 13 of that effect.

The operating unit 16 performs the operation for the user to accord ranks in the order of priority to the respective local wireless communication devices.

The display unit 17 outputs an operating menu referred to by the user according the order of priority to the respective local wireless communication devices.

The RF unit 18 performs the RF signal related processing, while the signal processor 19 processes received signals and transmitted signals.

The loudspeaker 20 outputs the received speech, while the microphone 21 inputs the speech.

The local wireless communication unit 22 performs the processing relevant to the local wireless communication, such as electric wave transmission/reception commands of the local wireless communication.

The recording medium 23 has stored therein a program for realizing the processing of various portions (program that may be executed by the computer).

The local wireless communication unit 22 and the local wireless communication device are provided with the function for realizing the short range wireless communication system, featured by short-range and low power dissipation [standardized systems, such as IEEE802.11b, IEEE802.11a or IEEE802.11g, used for wireless LAN (Local Area Network) or Bluetooth (Registered Trademark)].

The local wireless communication device may be enumerated by for example a headset, a hands free kit, a PC (personal computer), or PDA (Personal Digital Assistant).

Meanwhile, the structure and the operation of the local wireless communication device, such as one described above, is known among those skilled in the art and hence the description thereof is omitted. In the present embodiment, it is assumed that the local wireless communication device at least has the function of returning a response to a request for connection by local wireless communication from the mobile phone 1 and of transmitting/receiving speech signal or data signal to/from mobile phone 1.

Figure 2:
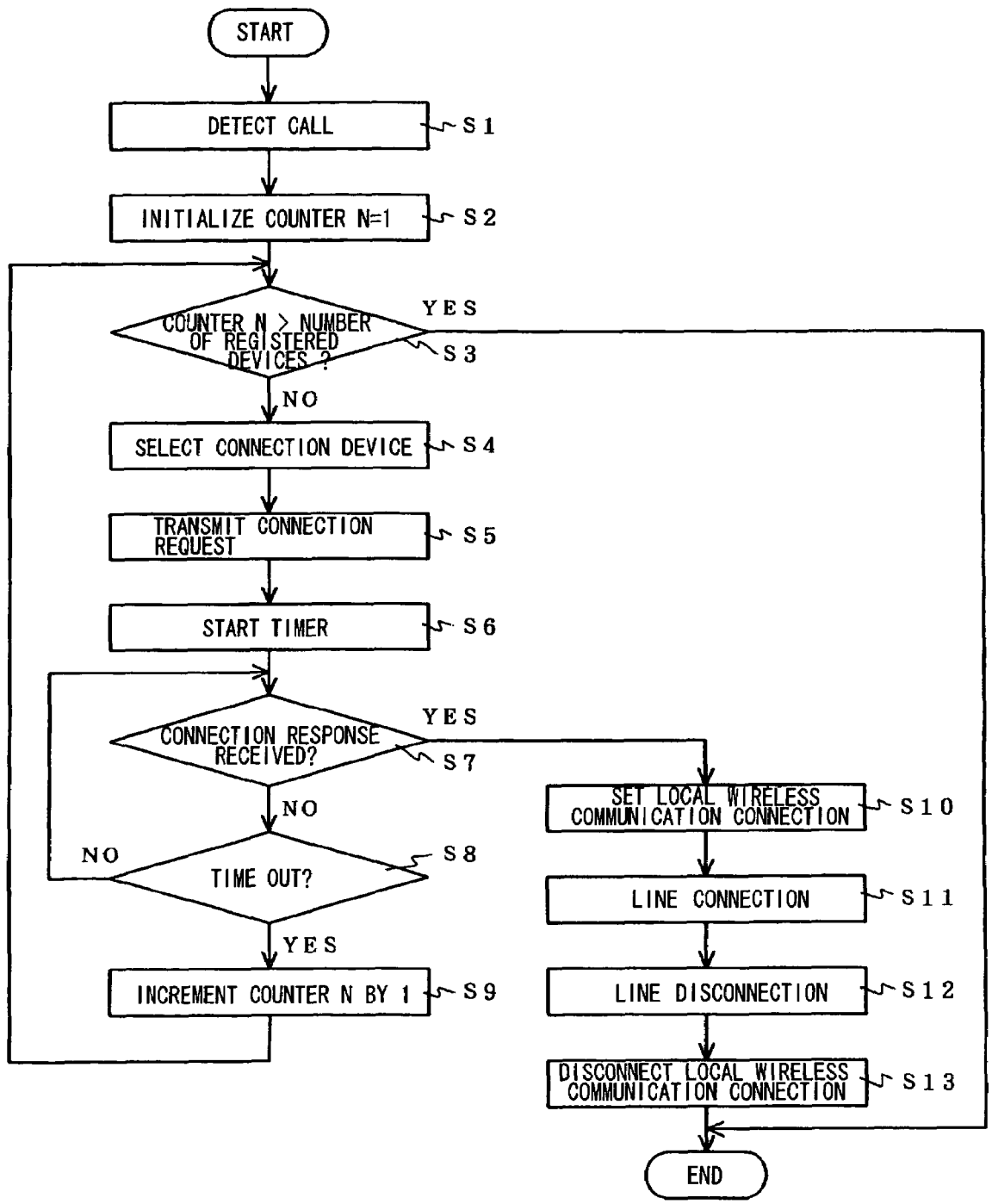
FIG. 2 is a flowchart showing the operation of the mobile phone according to a first embodiment of the present invention.

FIG. 2 depicts a flowchart for illustrating the operation of the mobile phone 1 according to the first embodiment of the present invention. Referring to FIGS. 1 and 2, the overall operation of the mobile phone 1 according to the present first embodiment is described. It is noted that the processing shown in FIG. 2 is carried out by the controller 13 (computer) executing the program stored in the recording medium 23.

On detection of an incoming call, the controller 13 sets an initial value 1 to the value of the counter N (step S2 of FIG. 2). The controller 1 checks whether or not the value of the counter N is larger than the total number of the local wireless communication devices registered in the memory 14 (step S3 of FIG. 2). If the value of the counter N is not larger than the total number of the registered local wireless communication devices, the controller 1 selects the local wireless communication device registered in a N'th rank in the order of priority (initially set to 1), from among the local wireless communication devices, registered in the memory 14, as a connection device (step S4 of FIG. 2).

The controller 13 controls the local wireless communication unit 22 and sends a connection request to the selected local wireless communication device (step S5 of FIG. 2) and causes the timer 15 to start its operation by setting a time of the timer (step S6 of FIG. 2).

When the local wireless communication unit 22 has received the connection request from the local wireless communication device, selected as described above (step S7 of FIG. 2), the controller 13 proceeds to the connection processing to establish the local wireless connection to send a signal for notifying the incoming call (step S10 of FIG. 2).

On receipt of a response signal for the incoming call from the local wireless communication device, the controller 13 controls the RF unit 18 to establish the network connection to set up a talk state or the state of data communication (step S11 of FIG. 2). On detection of the network disconnection (step S12 of FIG. 2), the controller 13 disconnects the local wireless communication (step S13 of FIG. 2).

If there is no response to the connection and the timer has timed out (steps S7 and S8 of FIG. 2), the controller 13 increments the value of the counter N by 1 (step S9 of FIG. 2) and reverts to the step S3 to repeat the above-described processing operations. When the value of the counter has exceeded the total number of the registered local wireless communication devices (step S3 of FIG. 2), the controller 13 terminates the above processing.

Figure 3:
FIG. 3 shows an illustrative structure of a memory shown in FIG. 1.

FIG. 3 shows an illustrative structure of the memory 14 of FIG. 1. In FIG. 3, three devices A, B and C are registered in the memory 14, as local wireless communication devices, and the priority order of each device, as set by the user from the outset, are registered such that "the device A is of the priority order 1", "the device B is of the priority order 2" and "the device C is of the priority order 3", as an example.

Referring to FIGS. 1 to 3, the operation of the mobile phone 1 of the first embodiment of the present invention is specifically explained. On detection of an incoming call (step S1 of FIG. 2), the controller 13 first initializes the counter N (N=1) (step S2 of FIG. 2).

The controller 13 then compares the value of the counter N=1 to the total number 3 of the local wireless communication devices registered in the memory 14 (step S3 of FIG. 2). Since the number of the counter N is smaller than the total number of the registered local wireless communication devices, the local wireless communication device, having the value of the priority order N equal to N, or 1, is selected, from among the local wireless communication devices, registered in the memory 14 (step S4 of FIG. 2). In this case, the device B is selected.

The controller 13 controls the local wireless communication unit 22 to send a connection request to the device B to start the operation of the timer 15 (steps S5 and S6 of FIG. 2). On receipt of the connection response from the device B, (step S7 of FIG. 2), the controller 13 controls the local wireless communication unit 22 to establish local wireless connection with the device B to send out a signal notifying the incoming call (step S10 of FIG. 2).

On receipt of a response signal to the incoming call from the local wireless communication device, the controller 13 controls the RF unit 18 to set up the connection to the network to establish the talk state or the state of data communication (step S11 of FIG. 2). On detection of disconnection of the network connection (step S12 of FIG. 12), the controller 13 controls the local wireless communication unit 22 to disconnect the local wireless communication (step S13 of FIG. 2).

If the power supply of the device B is off or the device B is not located in a range which allows for communication, as a result of which no connection response is returned from the device B (step S7 of FIG. 2), or the timer 15 has timed out (step S8 of FIG. 2), the controller 13 determines that the device B is in communication disabled state and increments the counter N by 1 such that N=2 (step S9 of FIG. 2).

The controller 13 compares the value of the counter N=2 to the total number 3 of the local wireless communication devices, registered in the memory 14. Since it is the value of the counter N that is smaller, the controller 13 determines that there is some other device that has been registered, and continues the processing (step S3 of FIG. 2).

The controller 13 then selects the device A of the priority order 2 which is of the same value as the value of the counter N, and sends a connection request. If the controller 13 is unable to receive the connection request from the device A, and the timer 15 has timed out, the controller 13 determines that the device A is also disabled for communication and increments the value of the counter N by 1 such that N=3 (step S9 of FIG. 2).

The controller 13 compares the value of the counter N=3 to the total number 3 of the local wireless communication devices. Since the value of the counter N is equal to the total number of the local wireless communication devices, the controller 13 determines that there is another registered device, and continues the processing (step S3 of FIG. 2).

The controller 13 then selects the connection device C, having the value of the priority order 3 which is the same as the counter value, as the connection device, and transmits a connection request. If the timer 15 has timed out before receipt of the connection response from the device C, N is set to 4 (N=4).

The controller 13 compares the value of the counter N=4 to the total number 3 of the local wireless communication devices registered in the memory 14. Since it is the total number of the registered local wireless communication devices that is smaller, the controller 13 determines that, although attempts have been made for establishing connection with the totality of the registered local wireless communication devices, such connection was not possible, and terminates the processing.

Thus, with the present embodiment, local wireless communication connection may be established only in case of having talk by telephone or effectuating data communication, by automatically establishing the connection for local wireless communication on detection of the incoming call, and by automatically disconnecting the connection for local wireless communication on detection of the disconnection of the line, such that connection need not be made at all times, thereby to suppress wasteful power dissipation and to assure sufficient battery protection.

Moreover, with the present embodiment, connection requests may be sent to the registered local wireless communication devices in the descending order of the priority data previously allocated by the user to the registered local wireless communication devices, and the processing for establishing the connection may be performed for the local wireless communication device from which the response for connection has been returned, such that connection may be established for the local wireless communication device which ranks foremost in the priority order of the local wireless communication devices that may be connected under the prevailing use states. Thus, it is possible to automatically select the one of the plural registered local wireless communication devices which is suited under the prevailing situation, based on the user's intention, and to establish the connection for the so selected local wireless communication device.

Figure 4:
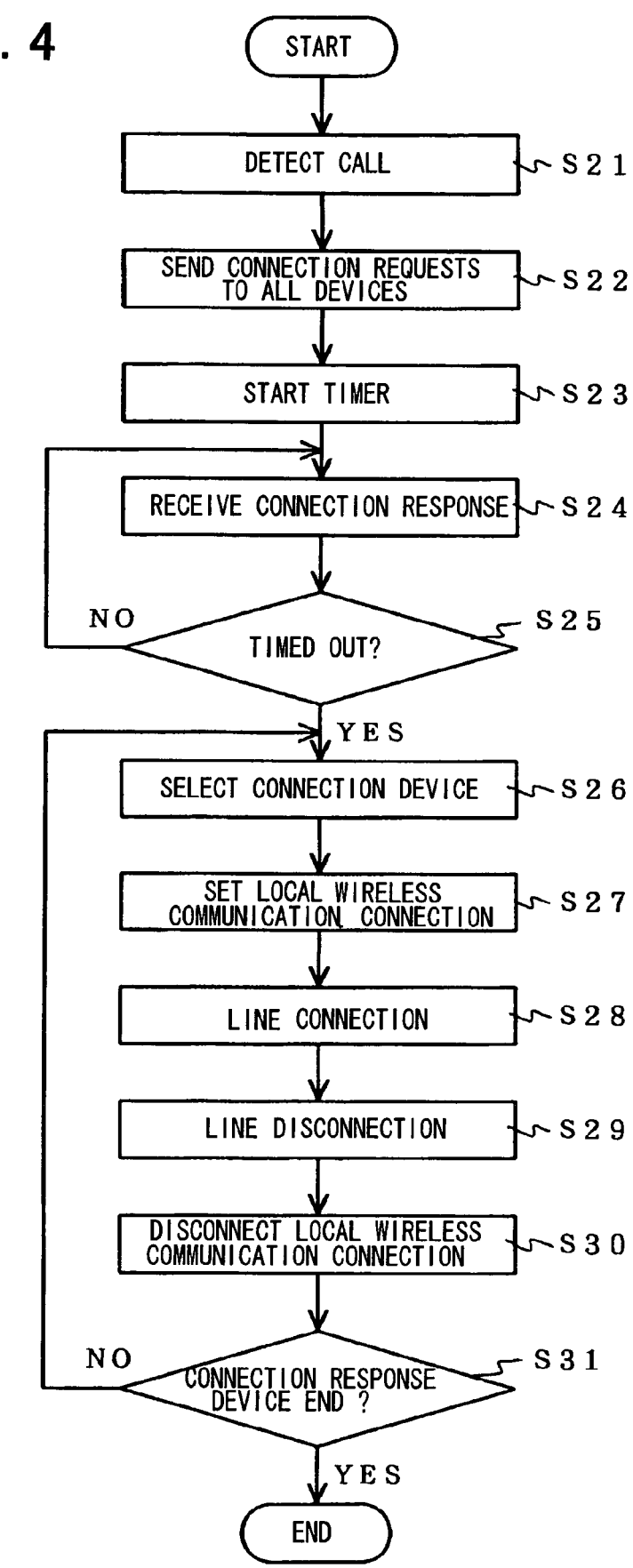
FIG. 4 is a flowchart showing the operation of the mobile phone according to a second embodiment of the present invention.

FIG. 4 is a flowchart for illustrating the operation of a mobile phone according to the second embodiment of the present invention. Since the mobile phone of the present second embodiment of the present invention is of the same structure as the mobile phone 1 of the first embodiment shown in FIG. 1, the overall operation of the mobile phone according to the second embodiment of the present invention is explained with reference to FIGS. 1 and 4. Meanwhile, the processing shown in FIG. 4 may be achieved by the controller 13 executing the program of the recording medium 23.

In the first embodiment of the present invention, for establishing the connection with one of the connectable local wireless communication devices which ranks first in the priority order, a connection request is transmitted to the local wireless communication devices with the values of the priority order of 1 to N, beginning first of all at the local wireless communication device having the highest rank among these local wireless communication devices. If a connection response is made from this first rank device within a preset time interval, the local wireless communication connection is established with this local wireless communication device.

If conversely there is made no response, the controller determines that the local wireless communication device is disabled for connection. Thus, the controller sequentially repeats the processing in the order of the local wireless communication device which ranks second in the priority order, the local wireless communication device which ranks third in the priority order, the local wireless communication device which ranks fourth in the priority order and so forth up to the local wireless communication device which ranks N'th in the priority order.

On the other hand, in the second embodiment of the present invention, the controller 13 on detection of the incoming call (step S21 of FIG. 4) controls the local wireless communication unit 22 to transmit connection requests to the totality of the local wireless communication devices registered in the memory 14 (step S22 of FIG. 4) and to start the timer 15 (step S23 of FIG. 4).

The controller 13 awaits the connection responses from the respective local wireless communication devices until the timer 15 times out (step S24 of FIG. 4). When the timer 15 has timed out (step S25 of FIG. 4), the controller 13 selects, from among the local wireless communication devices, from which the connection responses have been received, the local wireless communication device which ranks topmost in the priority order (step S26 of FIG. 4) and controls the local wireless communication unit 22 to perform the connection processing for the selected local wireless communication device (steps S27 to S30 of FIG. 4). Moreover, in effectuating the connection processing for plural local wireless communication devices, the controller 13 performs the above processing repeatedly (steps S26 to S31 of FIG. 4).

In the present embodiment, the time as from detection of an incoming call until establishment of the local wireless connection may be made shorter in this manner. This method is effective when a large number of the local wireless communication devices have been registered.

As in the first embodiment, described above, the memory 14 used in the second embodiment of the present invention is configured as shown in FIG. 3. For example, it is assumed that three devices A to C have been registered as the local wireless communication devices in the memory. 14, and the priority order of each device, as set by the user from the outset, is registered such that "the device A ranks second in the priority order", "the device B ranks first in the priority order" and "the device C is of the priority order 3", as an example.

On detection of the incoming call, the controller 13 transmits connection requests to the totality of the devices A to C and starts up the timer 15. The controller 13 awaits the connection response from the respective devices until a time-out notice is sent from the timer 15.

If it is assumed that the connection responses have been made from the two devices A and B, the controller 13 on time out of the timer 15 compares the priority orders of the devices A and B to each other. Since it is the device B that is higher in the priority order, the controller performs the connection processing for the device B to establish the local wireless connection.

Figure 5:
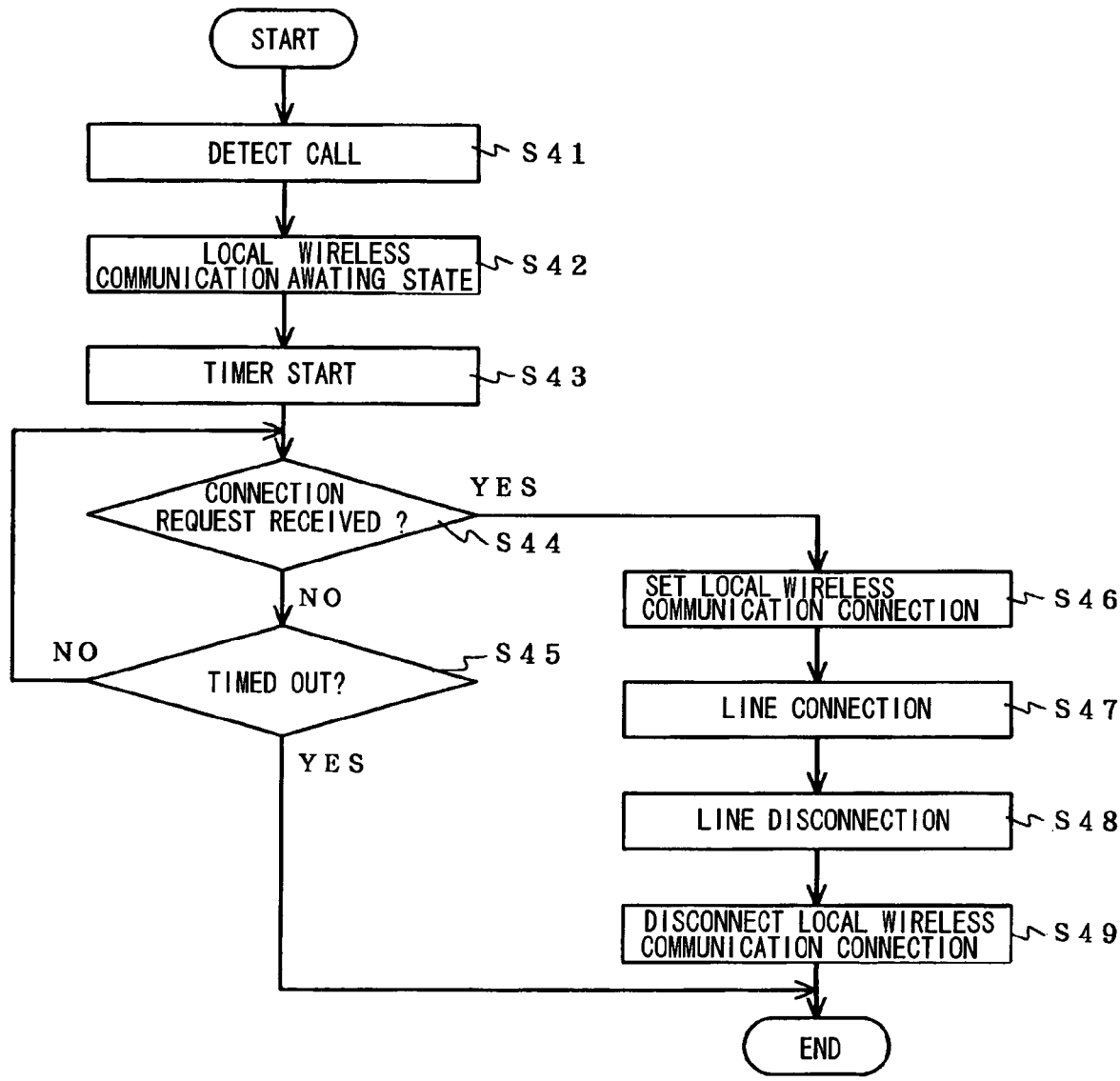
FIG. 5 is a flowchart showing the operation of the mobile phone according to a third embodiment of the present invention.

FIG. 5 depicts the flowchart showing the operation of the mobile phone according to a third embodiment of the present invention. Since the mobile phone of the third embodiment of the present invention is similar in structure to the mobile phone 1 of the first embodiment of the present invention, shown in FIG. 1, the overall operation of the mobile phone 1 of the third embodiment of the present invention is explained with reference to FIGS. 1 and 5.

Meanwhile, the processing shown in FIG. 4 is achieved by the controller 13 (computer) which executes the program of the recording medium 23.

The above-described first and second embodiments are directed to a method of automatically connecting from the mobile phone 1 to the local wireless communication functional device, registered in the memory 14. In the third embodiment of the present invention, the local wireless communication unit 22 is kept in the awaiting state, in consideration of a case where it is desired to make connection to a device not registered in the memory 14, or a case where, due to e.g. technical problem of local wireless communication, the connection processing cannot be started from the mobile phone 1.

For example, on detection of an incoming call (step S41 of FIG. 5), the controller 13 controls the local wireless communication unit 22 to set the unit to the local wireless communication awaiting state (step S42 of FIG. 5) to start the timer 15 (step S43 of FIG. 5).

The controller 13 awaits the connection requests from the respective local wireless communication devices until the timer 15 times out (step S44 of FIG. 5). On receipt of the connection request from the local wireless communication device, the controller 13 controls the local wireless communication unit 22 to effectuate the connection processing for the local wireless communication device which has sent the connection request.

In the present embodiment, such a method, other than the above method, may be used which, in determining the priority order of the registered local wireless communication devices, adds an alternative of awaiting the connection from other local wireless communication devices.

FIG. 6 shows an illustrative structure of a memory according to a fourth embodiment of the present invention. In FIG. 6, there are registered, in the memory of the fourth embodiment of the present invention, as local wireless communication devices, a device A, a device B and a local wireless communication function awaiting. The priority order of each device, as set by the user from the outset, is registered in the memory, such that "the device A ranks second in the priority order", "the device B ranks first in the priority order 2" and "the local wireless communication function awaiting ranks third in the priority order", as an example.

On the incoming call, the controller attempts to make connections to the device A and then to the device B. If these devices are unconnectable, the controller sets the local wireless communication unit to the local wireless communication function awaiting state.

Figure 7:
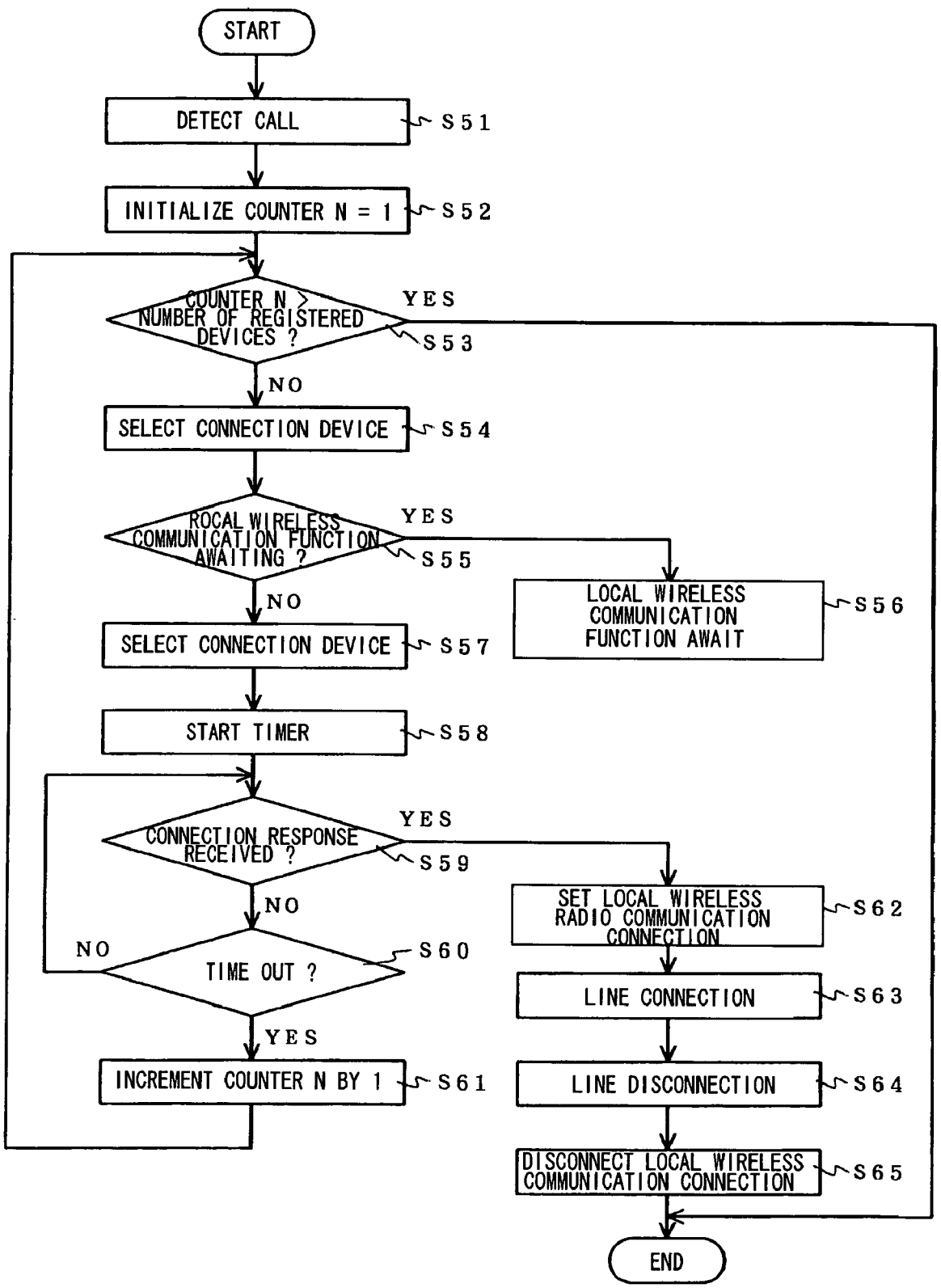
FIG. 7 is a flowchart showing the operation of a mobile phone according to a fourth embodiment of the present invention.

FIG. 7 depicts a flowchart showing the operation of the mobile phone according to a fourth embodiment of the present invention. Since the mobile phone according to the fourth embodiment of the present invention is of the same structure as the mobile phone 1 of the fourth embodiment of the present invention, the overall operation of the mobile phone 1 according to the fourth embodiment of the present invention is explained by referring to FIGS. 1, 6 and 7. Meanwhile, the processing shown in FIG. 7 is carried out by the controller 13 (computer) which executes the program of the recording medium 23.

On detection of an incoming call (step S51 of FIG. 7), the controller 13 initializes the counter N (N=1) (step S52 of FIG. 7). The controller 13 compares the value N of the counter N=1 with the total number 3 of the local wireless communication devices registered in the memory 14 (step S53 in FIG. 7). Since the value of the counter N is smaller than the total number of the registered local wireless communication devices, the local wireless communication device having the value of the rank 1 in the priority order equal to the value of N is selected as the connection device (step S54 in FIG. 7). In this case, the device. B is selected.

The controller 13 controls the local wireless communication unit 22 to transmit a connection request to the device B and to start the operation of the timer 15 (steps S57 and S58 of FIG. 7). On receipt of the connection response of the device B (step S59 of FIG. 7), the controller 13 controls the local wireless communication unit 22 to establish the local wireless connection with the device B and sends out a signal notifying the incoming (step S62 of FIG. 7).

On receipt from the local wireless communication device of the signal indicating the response to the incoming call, the controller 13 controls the RF unit 18 to interconnect the network to set a talk state or a state of data communication (step S63 of FIG. 7). On detecting that the line is disconnected (step S64 of FIG. 7), the controller 13 controls the local wireless communication unit 22 to disconnect the local wireless communication (step S65 of FIG. 2).

Should there be no connection response from the device B (step S59 of FIG. 7) due to, for example, the power supply of the device B being off or to the local wireless communication device not being in a communication enabled state, and the timer 15 has timed out (step S60 of FIG. 7), the controller 13 determines that the device B is in the communication disabled state, and increments the counter N by 1 so that N=2 (step S61 of FIG. 2).

The controller 13 compares the value of the counter N=2 to the total number 3 of the local wireless communication devices registered in the memory 14. Since it is the value of the counter N that is smaller, the controller 13 determines that there is some other registered device, and continues the processing (step S53 of FIG. 7).

The controller 13 then selects the device A, having the priority order of 2 equal to the value of the counter N, as the connection device, and transmits the connection request. If the connection response from the device A cannot be received and the timer 15 has timed out, the controller 13 determines that the device A is also disabled for communication, and increments the counter N by 1 so that N=3 (step S61 of FIG. 7).

The controller 13 compares the value of the counter N=3 with the total number 3 of the local wireless communication devices registered in the memory 14. Since the value of the counter N is equal to the total number of the local wireless communication devices, the controller determines that there is a further registered device and continues the processing (step S53 of FIG. 7).

The controller 13 then selects the local wireless communication function awaiting having the same priority order of 3 as counter value (steps S54 and S55 of FIG. 7) to transfer to the local wireless communication function awaiting state.

Figure 8:
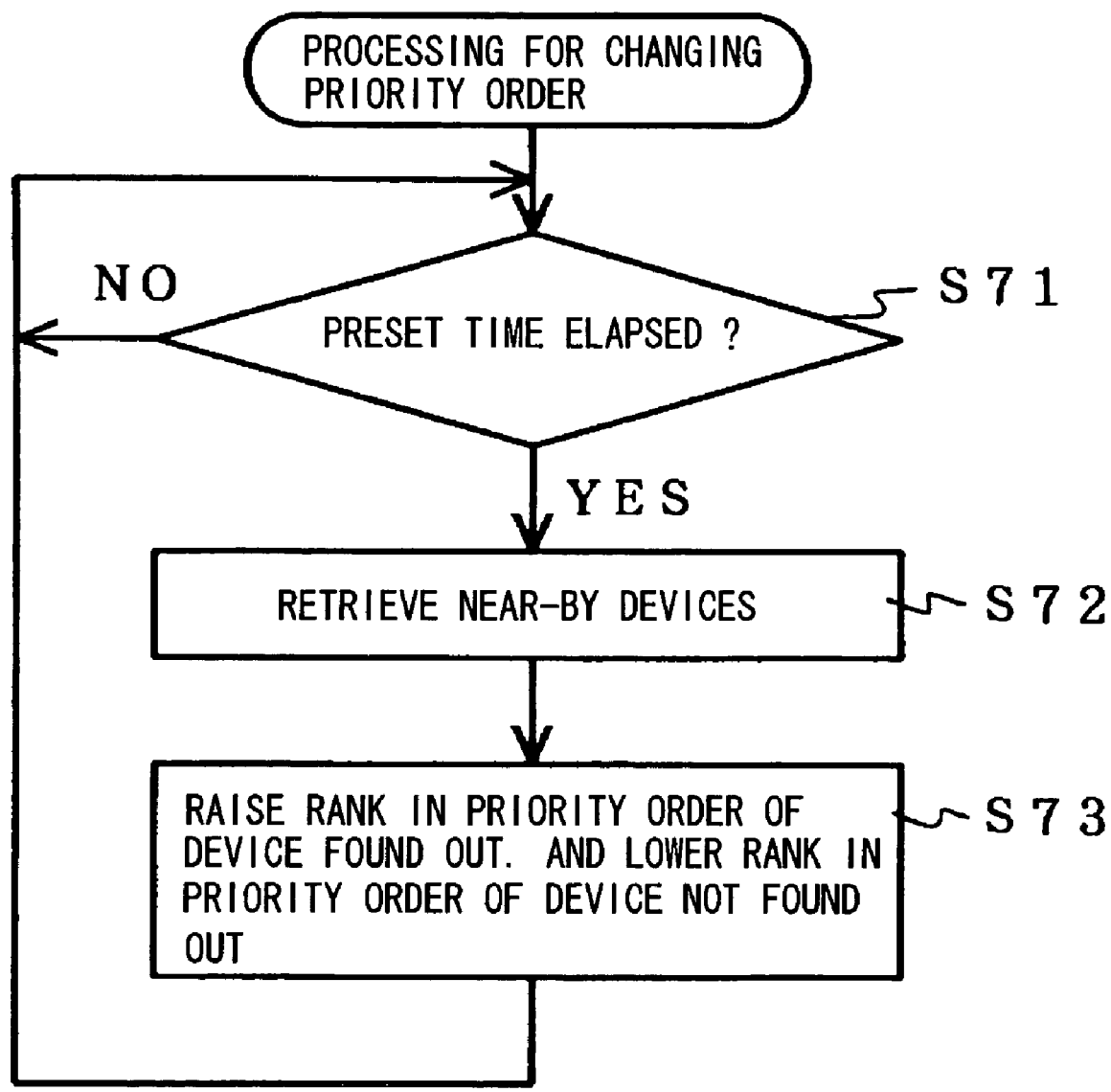
FIG. 8 is a flowchart showing the processing of changing the priority order of a mobile phone according to a fifth embodiment of the present invention.

FIG. 8 depicts a flowchart showing the processing for changing the priority order of the mobile phone of a fifth embodiment of the present invention. Since the mobile phone 1 according to the fifth embodiment of the present invention is similar in structure to the mobile phone 1 of the first embodiment of the present invention, shown in FIG. 1, the processing of changing the priority order of the mobile phone 1 of the fifth embodiment of the present invention is explained with reference to FIGS. 1 and 8. Meanwhile, the processing shown in FIG. 8 is carried out by the controller 13 (computer) which executes the program stored in the recording medium 23.

In the above-described embodiment, the destination of connection is selected based on the user determining the priority order and registering the so determined priority order in the memory 14. Alternatively, such a method may be contemplated in which the mobile phone 1 automatically assigns or changes the priority order.

In the present embodiment, a near-by device is searched at a preset constant time interval, such as every five minutes (steps S71 and S72 of FIG. 8), the priority order of a device found out is raised and the device which has not been found out is lowered. In such a manner that the mobile phone 1 dynamically changes the priority sequence (step S73 of FIG. 8). In this manner, the present embodiment is able to adapt itself to the changing surrounding environment.

Figure 9:
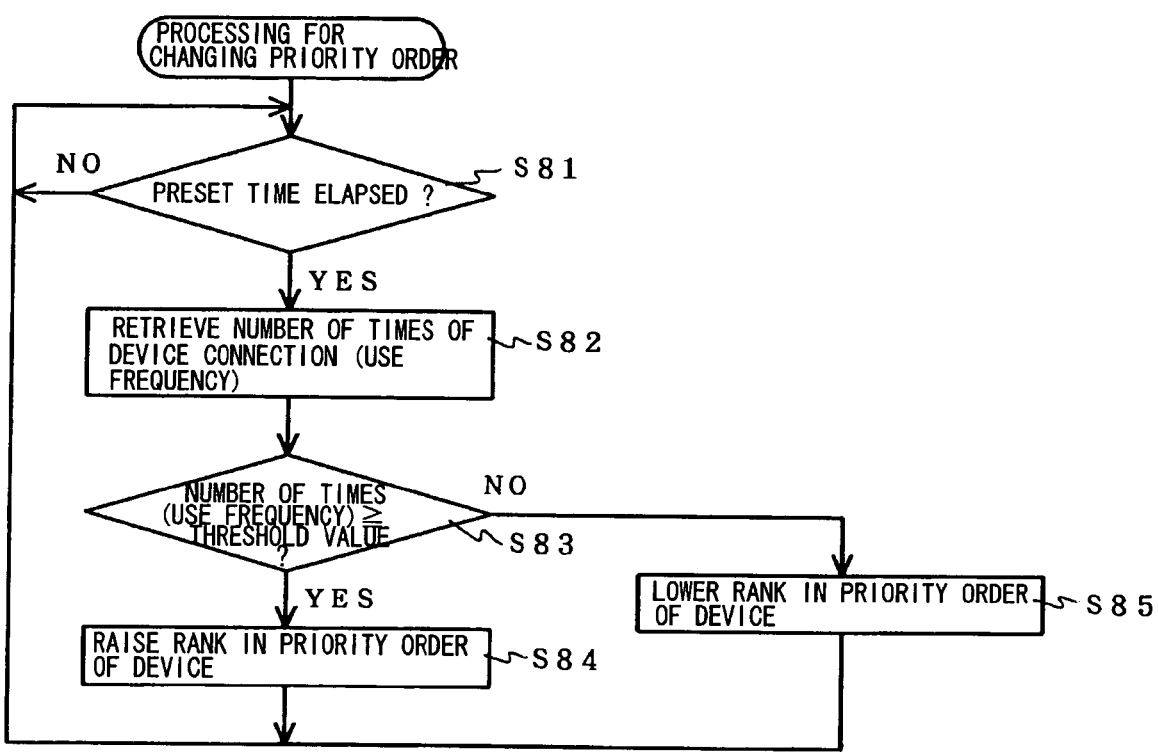
FIG. 9 is a flowchart showing the processing of changing the priority order of a mobile phone according to a sixth embodiment of the present invention.

FIG. 9 depicts a flowchart showing the processing of changing the priority order in the mobile phone according to a sixth embodiment of the present invention. Since the mobile phone according to the sixth embodiment of the present invention is similar in structure to the mobile phone 1 of the first embodiment, shown in FIG. 1, the overall operation of the mobile phone 1 of the sixth embodiment is explained with reference to FIGS. 1 and 9. Meanwhile, the processing shown in FIG. 9 is achieved by the controller 13 (computer) executing the program stored in the recording medium 23.

In the present embodiment, the number of times of connection of a given device (use frequency) is retrieved at a preset constant time interval, such as every week (steps S81 and S82 of FIG. 9). If the number of times of connection of the device (use frequency) is larger than a preset threshold value (step S83 of FIG. 9), the rank of the device in the priority order is raised (step S84 of FIG. 9).

Moreover, in the present embodiment, if the number of times of connection of the device (use frequency) is less than a preset threshold value (step S83 of FIG. 9), as when the device has not been connected over a preset time duration, such as for one week, the rank of the device in the priority order is lowered (step S85 of FIG. 9). In this manner, the present embodiment is able to cope with the changing surrounding environment.

The advantageous effects of the present invention are summarized as follows. The mobile phone of the present invention, described above, having the function of local wireless communication for realizing the short range wireless communication system, includes a memory for pre-registering the information of the wireless communication device, configured for having communication by the short range wireless communication system, and means for transmitting a connection request, in case of an incoming, to a local wireless communication device, registered in the memory, using a function of local communication, so that it is unnecessary to connect the mobile phone at all times, while it becomes possible to suppress wasteful power dissipation and to assure battery protection.

Moreover, the mobile phone according to a modification of the present invention includes means for determining a connection device, in accordance with a predetermined priority order, from among the plural local wireless communication devices registered in the memory, on the occasion of an incoming, and a connection request is sent to the so determined local wireless communication device, using the function of local wireless communication, so that it is possible to automatically select a proper one of plural registered local wireless communication devices, depending on the prevailing use state, based on the user's intention, in order to establish the connection.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile phone apparatus comprising:
   local wireless communication means for realizing a short range wireless communication system;
   a memory for registering a plurality of local wireless communication devices adapted for communication in accordance with said short range wireless communication system, said plurality of local wireless communication devices registered in said memory in accordance with a predetermined priority order, and a rank in said priority order accorded to an awaiting state of said local wireless communication means, said rank registered in said memory;
   means for controlling said local wireless communication means to transmit a connection request to each of the local wireless communication devices registered in said memory, on a detection of an incoming call; and
   means for determining, on the detection of the incoming call, one of the awaiting state and a device for connection from among said plurality of local wireless communication devices registered in said memory, wherein said connection request is transmitted to the determined local wireless communication device by said local wireless communication means.

2. The mobile phone apparatus according to claim 1, further comprising means for controlling said local wireless communication means to disconnect said local wireless communication connection, when a line having established connection with said local wireless communication device is disconnected.

3. A mobile phone apparatus comprising:
   local wireless communication means for realizing a short range wireless communication systems;
   a memory for registering a plurality of local wireless communication devices adapted for communication in accordance with said short range wireless communication system;
   means for controlling said local wireless communication means to transmit a connection request to each of the plurality of local wireless communication devices registered in said memory, on a detection of an incoming call; and
   means for determining one of an awaiting state and a device for connection from among said local wireless communication devices, each device making a connection response to said connection request, in accordance with a preset priority order.

4. The mobile phone apparatus according to claim 3, further comprising means for controlling said local wireless communication means to disconnect said local wireless communication connection, when a line having established connection with said local wireless communication device is disconnected.

5. The mobile phone apparatus according to claim 1, further comprising: means for searching near-by-local wireless communication devices at a preset constant time interval; and means for dynamically changing said priority order responsive to the search result.

6. The mobile phone apparatus according to claim 3, further comprising:
   means for searching near-by local wireless communication devices at a preset constant time interval; and means for dynamically changing said priority order responsive to the search result.

7. The mobile phone apparatus according to claim 1, further comprising: means for retrieving use frequency of the local wireless communication devices at a preset constant time interval; and means for dynamically changing said priority order responsive to the retrieved use frequency.

8. The mobile phone apparatus according to claim 3, further comprising:
   means for retrieving use frequency of the local wireless communication devices at a preset constant time interval; and
   means for dynamically changing said priority order responsive to the retrieved use frequency.

9. A mobile phone apparatus comprising:
   local wireless communication means for realizing a short range wireless communication system;
   means for setting said local wireless communication means to an awaiting state on an occasion of an incoming call; and
   means for controlling said local wireless communication means to perform connection processing to the local wireless communication device, on receipt of a connection request which said local wireless communication device issues, during a period of said local wireless communication means being in said awaiting state.

10. A method of performing local wireless communication by a mobile phone apparatus including a function of local wireless communication for realizing a short range wireless communication system, said method comprising the steps of:
    detecting an incoming call to said mobile phone apparatus;
    transmitting, on the detection of said incoming call, a connection request, using said function of local wireless communication, to one of a plurality of local wireless communication devices registered in a memory for pre-registering said local wireless communication devices with which said mobile phone apparatus communicates in accordance with said short range wireless communication system, said plurality of local wireless communication devices registered in said memory in accordance with a predetermined priority order and a rank in said priority order accorded to an awaiting state of said function of local wireless communication, said rank registered in said memory;
    determining on the detection of said incoming call one of the awaiting state and a local wireless communication device for connection from among the plurality of local wireless communication devices registered in said memory in accordance with a pre-set priority order; and
    transmitting the connection request to the determined local wireless communication device, using said function of local wireless communication.

11. The method according to claim 10, further comprising the step of:
    disconnecting said local wireless communication connection when a line connection with said local wireless communication device is disconnected.

12. The method according to claim 10, further comprising the steps of:
    searching near-by local wireless communication devices at a preset constant time interval; and
    dynamically changing said priority order responsive to the retrieved use frequency.

13. The method according to claim 10, further comprising the steps of:
    searching the use frequency of near-by local wireless communication devices at a preset constant time interval; and
    dynamically changing said priority order responsive to the retrieved use frequency.

14. A method of performing local wireless communication by a mobile phone apparatus including a function of local wireless communication for realizing a short range wireless communication system, said method comprising the steps of:
    detecting an incoming call to the mobile phone apparatus; and
    transmitting, on the detection of the incoming call, a connection request to each of a plurality of local wireless communication devices registered in a memory for pre-registering said local wireless communication devices, with which said mobile phone apparatus communicates in accordance with said short range wireless communication system; and
    determining one of an state and a local wireless communication device for connection from among the plurality of local wireless communication devices, said determined local wireless communication device making a connection response to said connection request, in accordance with a pre-set priority order.

15. The method according to claim 14, further comprising the step of:
    disconnecting said local wireless communication connection when a line connection with said local wireless communication device is disconnected.

16. The method according to claim 14, further comprising the steps of:
    searching near-by local wireless communication devices at a preset constant time interval; and
    dynamically changing said priority order responsive to the retrieved use frequency.

17. The method according to claim 14, further comprising the steps of:
    searching the use frequency of near-by local wireless communication devices at a preset constant time interval; and
    dynamically changing said priority order responsive to the retrieved use frequency.

18. A method of performing local wireless communication by a mobile phone apparatus including a function of local wireless communication for realizing a short range wireless communication system, said method comprising the steps of:
    detecting an incoming call to said mobile phone apparatus;
    setting said function of local wireless communication to an awaiting state on the detection of said incoming call; and
    performing connection processing to a local wireless communication device, using said function of local wireless communication, on receipt of a connection request which the local wireless communication device issues, during a period of said function of local wireless communication being in said awaiting state.

19. A computer program embodied on a computer readable medium for enabling a computer constituting a mobile phone apparatus including a function of local wireless communication for realizing a short range wireless communication system to execute a local wireless communication processing, said computer program comprising code segments to enable the computer to execute the steps of:

detecting an incoming call to the mobile phone apparatus; and transmitting, on the detection of said incoming call, using said function of local wireless communication, a connection request to one of a plurality of local wireless communication devices registered in a memory for pre-registering said local wireless communication devices, with which said mobile phone apparatus communicates in accordance with said short range wireless communication system, said plurality of local wireless communication devices registered in said memory in accordance with a predetermined priority order and a rank in said priority order accorded to an awaiting state of said function of local wireless communication, said rank registered in said memory;

determining on the detection of said incoming call one of the awaiting state and a local wireless communication device for connection from among the plurality of local wireless communication devices registered in said memory in accordance with a pre-set priority order; and transmitting the connection request to the determined local wireless communication device, using said function of local wireless communication.

20. A computer program embodied on a computer readable medium for enabling a computer constituting a mobile phone apparatus including a function of local wireless communication for realizing a short range wireless communication system to execute a local wireless communication processing, said computer program comprising code segments to enable the computer to execute the steps of:

detecting an incoming call to the mobile phone apparatus;

transmitting a connection request to each of a plurality of local wireless communication devices registered in a memory for pre-registering said local wireless communication devices, with which said mobile phone apparatus communicates in accordance with said short range wireless communication system on the detection of the incoming call; and determining one of an awaiting state and a local wireless communication device for connection from among the plurality of local wireless communication devices, said determined local wireless connection device making a connection response to said connection request, in accordance with a pre-set priority order.

21. A computer program embodied on a computer readable medium for enabling a computer constituting a mobile phone apparatus including a function of local wireless communication for realizing a short range wireless communication system to execute a local wireless communication processing, said computer program comprising code segments to enable the computer to execute the steps of:

detecting an incoming call to said mobile phone apparatus;

setting said function of local wireless communication to a waiting state on the detection of said incoming call; and performing connection processing to the local wireless communication device, using said function of local wireless communication, on receipt of a connection request which the local wireless communication device issues, during a period of said function of local wireless communication being in said waiting state.

* * * * *